Oct. 23, 1934.   J. J. HOLUB   1,978,203
LOCK FOR SECTIONS OF SHEET METAL PIPE
Filed April 20, 1933
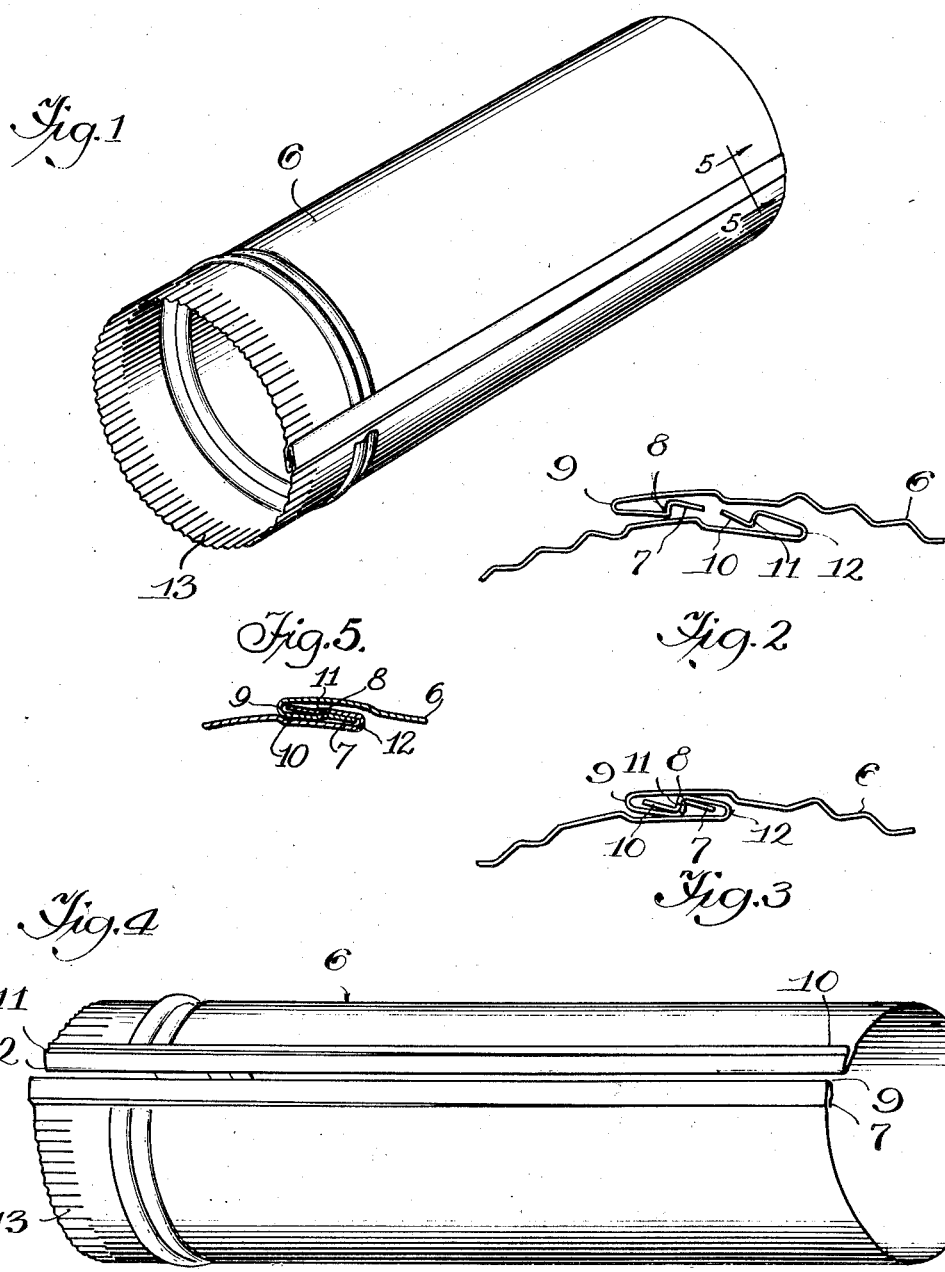
INVENTOR.
John J. Holub,
BY Benj. T. Woodhouse
ATTORNEY.
Witness:

Patented Oct. 23, 1934

1,978,203

UNITED STATES PATENT OFFICE 1,978,203

LOCK FOR SECTIONS OF SHEET METAL PIPE

John J. Holub, Cicero, Ill., assignor to The Excelsior Steel Furnace Company, Chicago, Ill., a corporation of Illinois Application April 20, 1933, Serial No. 667,023

2 Claims. (Cl. 126—309)

My present invention relates to improvements in locks for sections of sheet metal pipe.

The manufacturers of sheet metal pipe have long realized the desirability of producing sheet metal pipe sections so the sections of pipe could be nested for shipment and storage. In order to permit the nesting of sections of pipe the longitudinal edges of the blanks from which the sections of pipe are formed are provided or formed so as to interlock and prevent the separation of the interlocked edges either by a compressive or expansive effort exerted circumferentially of the pipe section. Heretofore such pipe locks, which have not required the pounding of the engaging edges to complete the lock, have involved the introduction of one longitudinal edge of a pipe section into a pocket provided upon the opposite longitudinal edge by means of a circumferentially compressive action or effort exerted upon the pipe section. Certain of such locks are generally effective and practical with pipe of relatively small diameter, providing the tinsmith who finally installs the stove pipe can be prevailed upon to refrain from pounding the seam which he is inclined to do as that is the general practice in setting up or completing a seam in sheet metal or tin. Such a final pounding, however, not infrequently destroys or materially impairs the efficiency of pipe locks of the class above referred to. When a sheet metal pipe is of nine inches or more in diameter locks which engage upon circumferential compression are unsuitable and impracticable as the amount of compressive effort necessary to secure an interlocking bends the metal of the pipe beyond the limit of elasticity and results in a permanent distortion.

I have had for my object the provision of a pipe lock for sections of sheet metal pipe which is equally applicable to pipe of both small and large diameter and it will hereafter be seen that my present pipe lock may be employed on pipe of two or three inches in diameter and on pipe of twenty-four or thirty-six inches in diameter without any tendency to collapse and deform the pipe in locking the adjacent edges of a section.

I have further had as an object the provision of a pipe lock for sheet metal pipe which, while locking the pipe dependably without pounding the seam together, will not be injured or impaired in the event that the tinsmith does unnecessarily pound or set up the seam.

I have accomplished the foregoing objects by means of the structure illustrated in the accompanying drawing in which—

Fig. 1 is a perspective of a section of sheet metal pipe embodying my invention.

Fig. 2 is a fragmental detail transverse to the interlocking edges through the corrugated end of the pipe, the interlocking portions being shown out of engagement.

Fig. 3 is a view similar to Fig. 2 with the interlocking edges of the pipe shown in engagement, and Fig. 4 is a perspective of a section of sheet metal pipe similar to the view in Fig. 1, the interlocking edges, however, being shown separated.

Fig. 5 is a fragmental view of the entered end of the pipe section showing the interlocking shoulders greatly reduced in height.

Similar reference characters refer to similar parts throughout the respective views.

The pipe in which I embody my invention is similar to other sheet metal pipe in that it consists of a rectangular blank 6 of the usual length and of a suitable width to secure the diameter of the pipe desired. One of the longitudinal edges of the blank 6, which we will regard as the overlaying edge, is provided with a depressed channel 7 which produces upon the opposite face of the metal an upstanding shoulder 8. This overlaying edge is then broken or bent, at 9, adjacent the channel 7 so that the shoulder 8 extends toward the body of the blank. The underlaying edge of the blank 6 has provided therein an upstanding ridge 10 which produces the shoulder 11 and just back of the shoulder 11 the underlaying edge is broken or bent, at 12, so that the shoulder 11 extends toward the body of the blank.

In assembling this lock the inwardly turned edge of the overlaying portion of the blank engages below the outwardly turned edge of the underlaying portion of the blank and by circumferentially pulling or expanding, instead of pressing or collapsing, the walls of the blank, the shoulders 8 and 11 pass by and fall behind each other, as shown by Fig. 3.

The height of the respective shoulders 8 and 11 are progressively reduced from the corrugated end of the pipe section 13, which enters the next adjacent section, to the uncorrugated end of the section, into which is inserted the next adjacent pipe section of pipe. This arrangement permits, by a wedging action, the disassembly of the respective sections, if such a disassembly is for any reason desired, and the presence of the shoulders 8 and 11 along the locking edges of a pipe section considerably stiffens the structure which is desirable in manipulating it and adds materially to its stability in assembled condition, particularly in pipes of larger diameter.

After pipe sections embodying my present lock are assembled no final pounding or seaming is required, but if the tinsmith who makes the installation insists upon pounding or finally seaming the joint, he will in no way interfere with the stability and dependability of the structure.

Having described my invention what I claim as new and desire to secure by Letters Patent is:

1. Sheet metal pipe comprising cylindrically formed rectangular blanks, the longitudinal meeting edges whereof are oppositely bent back adjacent the body of the blank, said bent back portions being further provided intermediate their breadths with offset shoulders extending respectively toward the adjacent body portion of the blank, said shoulders being adapted to pass by each other and interlock when the pipe is assembled.

2. Sheet metal pipe comprising cylindrically formed rectangular blanks, the longitudinal meeting edges whereof are oppositely bent back adjacent the body of the blank, said bent back portions being further provided intermediate their breadths with offset shoulders extending respectively toward the adjacent body portion of the blank and said shoulders being respectively diminished in height from the entering to the entered end of the section and being proportioned and located to pass behind each other and interfit in locked position.

JOHN J. HOLUB.